United States Patent [19]
Tognazzini et al.

[11] Patent Number: 5,831,594
[45] Date of Patent: Nov. 3, 1998

[54] METHOD AND APPARATUS FOR EYETRACK DERIVED BACKTRACK

[75] Inventors: Bruce Tognazzini, Woodside; Jakob Nielsen, Atherton; Robert Glass, Los Gatos, all of Calif.

[73] Assignee: Sun Microsystems, Inc., Mountian View, Calif.

[21] Appl. No.: 670,056

[22] Filed: Jun. 25, 1996

[51] Int. Cl.$^6$ .................................................. G09G 5/00
[52] U.S. Cl. ................................. 345/156; 345/146
[58] Field of Search ................... 345/7–9, 146, 345/156, 326, 335, 338, 339, 117, 328; 395/352, 353, 357

[56] References Cited

U.S. PATENT DOCUMENTS

| | | | |
|---|---|---|---|
| 4,984,179 | 1/1991 | Waldern | 345/8 |
| 5,363,481 | 11/1994 | Tilt | 395/352 |
| 5,396,264 | 3/1995 | Falcone et al. | 345/146 |
| 5,414,429 | 5/1995 | Giraudy | 342/185 |
| 5,452,452 | 9/1995 | Gaetner et al. | 395/673 |
| 5,537,132 | 7/1996 | Teraoka et al. | 345/146 |
| 5,539,871 | 7/1996 | Gibson | 395/762 |
| 5,546,528 | 8/1996 | Johnston | 395/352 |

FOREIGN PATENT DOCUMENTS

| | | | |
|---|---|---|---|
| Hei 2-179081 | 7/1990 | Japan . | |
| 4-67093 | 3/1992 | Japan | 345/127 |

OTHER PUBLICATIONS

"Instant HTML Web Pages", by Wayne Ause, 1995, Ziff–Davis Press, Chapter 1, pp. 1–15.

"Noncommand USer Interfaces", by Jakob Nielsen, Communications of the ACM, Apr. 1993, vol. 36, No. 4, pp. 83–99.

"Eye Controlled Media: Present and Future State", http://www.diku.dk/npanic/eyegaze/, by Arne John Glenstrup and Theo Engell–Nielsen, University of Copenhagen, Jun. 1, 1995, 16 pages.

"The Eyegaze Eyetracking System Example of a Multiple–Use Techology", by Joseph A. Lahound and Dixon Cleveland, LC Technologies, Inc., 4th Annual 1994 IEEE Dual–USe Technologies and applications Conference, May 23–24, 1994, 6 Pages.

"The Eyegaze Eyetracking System", by Dixon Cleveland and Nancy Cleveland, LC Technologies, Inc., Imagina Images Beyond Imagination Eleventh Monte–Carlo International Forum on New Images, Jan. 29–31, 1992, 8 Pages.

"Fourward Eyetrack", Warren Ward, Fourward Technologies, 2 Pages.

*Primary Examiner*—Richard Hjerpe
*Assistant Examiner*—Vui T. Tran
*Attorney, Agent, or Firm*—Daniel B. Curtis; Dehlinger & Associates

[57] ABSTRACT

Apparatus, methods, systems and computer program products are disclosed to assist a user of a display device to more quickly recover from a distraction causing the user to look away from the display device. The user is also assisted when navigating hypertext documents by the invention indicating where the user last looked in a restored, previously viewed hypertext document.

25 Claims, 13 Drawing Sheets

TITLE ~ 501

A sentence of words to make up a thought. Multiple sentences of words strung together to make up a paragraph. Such a paragraph then being a series of related thoughts about a topic. Multiple topics strung together describing a story, a fact, a design all tied up in chapters. These chapters then placed in a book.

503

Much of the above is less true today than in the past due to the advent of hypertext technology that allows a reader to quickly find the information of interest to the reader by following hyperlinks. Traditional footnoting soon will be a thing of the past and the hyperlinks can take the reader directly to the reference in its entirety.

505

A sentence of words to make up a thought. Multiple sentences of words strung together to make up a paragraph. Such a paragraph then being a series of related thoughts about a topic. Multiple topics strung together describing a story, a fact, a design all tied up in chapters. These chapters then placed in a book.

Much of the above is less true today than in the past due to the advent of hypertext technology that allows a reader to quickly find the information of interest to the reader by following hyperlinks. Traditional footnoting soon will be a thing of the past and the hyperlinks can take the reader directly to the reference in its entirety.

*Fig. 5A*

521 — WabiServer ▓▓▓ vides multiple, simultaneous users with all benefits of Wabi. (runs on Intel and SPARC)

523 — SunPC is a hardware/software solutions providing high performance for MSDOS on SPARC platforms.

525 — SoftWindows offers broad compatibility in a software only solution for running PC applications on SPARC platforms.

527 — Merge gives Solaris Intel users access to virtually all MSDOS and Microsoft Windows applications.

METHOD AND APPARATUS FOR EYETRACK DERIVED BACKTRACK

BACKGROUND OF THE INVENTION

1. Field of the Invention

This invention relates generally to the field of computer-human user interface technology and more particularly to a method, apparatus, system and computer program product for allowing a computer to automatically remember where a computer user last looked in a document presented on a display device and to restore that document to that position, and indicate that position, when the user again looks at the document.

2. Background

Human/Computer Interaction

An important characteristic of modem computing systems is the interface between the human user and the computer. Early interactive interfaces were text based wherein a user communicated with the computer by typing a sequence of characters on a keyboard and the computer communicated with the user by displaying characters on an output device—commonly a display screen. These input characters specified a command to the computer's operating system or to an application program executing on the computer. This command invoked program logic to perform a given operation. Modern computer systems use a graphical user interface (GUI) to simplify the interaction between a user and a computer. A GUI equipped computer communicates with a user by displaying graphics, including text and icons, on a display screen and the user communicates with the machine both by typing in textual information in response to dialogs and by manipulating the displayed icons with a pointing device, such as a mouse.

Many modem GUIs provide a window environment. In a typical window environment the graphical display portrayed on the display screen is arranged to resemble the surface of an electronic "desktop" and each application program running on the computer is represented as one or more electronic "paper sheets" displayed as rectangular regions on the display screen. These rectangular regions are called "windows". Each window may include a multitude of panes. Each pane being an area for a particular type of information (textual, still image, moving image, etc.).

Each window displays information generated by an associated application or system program. Further, there may be several windows simultaneously present on the desktop with each containing information generated by a program. A program presents information to the user through each window by drawing or "painting" images, graphics or text within the window. The user can also move a window to a different location on the display screen and change its size and appearance to arrange the desktop in a convenient manner. The user communicates with the program by "pointing at" objects displayed in the window with a cursor controlled by a pointing device and manipulating the objects as desired. In some cases the program requests additional information from the user in response to a manipulation. This request is presented as a "dialog" that allows the user to provide the requested information to the dialog from the keyboard.

Each window typically includes a number of standard graphical objects such as sizing boxes, buttons and scroll bars. These features represent user interface controls that the user can manipulate with the pointing device. When the controls are selected or manipulated, the GUI invokes program logic in the underlying program to effect a corresponding command.

The prior art in computer-human interfaces does not assist the computer user in traversing between different windows presented on a display device. Nor does the prior art assist the user in remembering where the user was in a document after the user has been distracted from the computer display.

Gaze Tracking Devices

Most gaze tracking devices operate based upon the principal that the direction of a person's gaze is directly related to the relative positions of the pupil and the reflection of an object off the cornea (gaze tracking is often termed eye tracking). These devices often include image processing capabilities that operate on a video image of an eye to determine the gaze direction of the eye. These image processing capabilities are enhanced by using the bright eye affect.

The bright eye affect is a result of the highly reflective nature of the retina. This characteristic of the retina means that a significant amount of the light that enters an eye is reflected back through the pupil. Thus, when light shines into an eye along the axis of a camera lens, the retina reflects a significant portion of the light back to the camera. Hence, the pupil appears as a bright disk to the camera. This affect allows the pupil to be more readily imaged from a video of an eye.

Other methods exist for gaze tracking. Some incorporate having two video cameras, one for tracking head movement and the other for measuring a reflection off of the eyes. Other mechanisms involve measuring electric potential differences between locations on different sides of an eye. High accuracy devices are very intrusive on the user and require that the user's head be held in a fixed position or that the user wear special equipment to track the eye.

Recently, an eyegaze eyetracking system has been developed as described in *The Eyegaze Eyetracking System—Unique Example of a Multiple-Use Technology*, 4th Annual 1994 IEEE Dual-Use Technologies and Applications Conference, May, 1994. This system comprises a video camera located below a computer display that monitors one of the user's eyes. The device also contains an infrared light emitting diode (LED) located at the center of the camera's lens to maximize the bright-eye affect. Image processing software on the computer computes the user's gazepoint on the display sixty times a second with an accuracy of about a quarter inch.

Gaze tracking devices have been used for weapon control, operator training, usability analysis, market research, and as an enablement for the disabled. However, gaze tracking devices have not been used to determine what characteristic of a computer's operation interests the computer user at a particular time or to allow the computer to adapt to a user's interest as demonstrated by where on the display screen the user is looking.

People are subject to many distractions and interruptions. Many people who are interrupted or distracted from a task find it difficult to remember what they were thinking and doing at the time of the interruption. Thus, when they attempt to resume the task significant time is lost while they recreate what they were thinking and doing. As a result, not only is the time required to handle the interruption or distraction lost from the task, but so is the time required to restore the user's awareness of the task. For example, a reader of a newspaper often finds it difficult to remember what article was being read (let alone what sentence or paragraph) after receiving and answering a phone call. Not only does this problem occur when reading paper, it also occurs when working on a task at a computer. Programmers find it difficult to reacquire the details of a program modification after being distracted by a question from a co-worker. Interrupts in a traditional office environment include phone calls, interruptions from an intercom; from co-workers for meetings, lunch, advice or support and many others.

Although a computer is an amazing productivity tool, it provides additional interrupts and distractions to those already existing in the traditional office environment. Some of these interruptions include the immediate notification of the arrival of new electronic mail (e-mail), video conferencing, immediate textual message communication, computer abnormalities, multiple programs each having at least one window requiring attention at random times and a host of other distractions and interrupts all seemingly cooperating to distract a person from the task at hand. Additionally, the traditional distractions of the workplace often cause the computer user to look away from the computer screen thus causing the user to forget where they were reading prior to the distraction.

A similar problem exists when navigating large hypertext entities (such as the World Wide Web (WWW)). Hypertext systems allow readers to choose their own paths through the available material by selecting specific hyperlinks to specific nodes containing the material. The background of the World Wide Web (WWW) and WWW browsers are well described by reference to the first chapter of *Instant HTML Web Pages*, by Wayne Ause, Ziff-Davis Press, ISBN 1-56276-363-6, Copyright 1995, pages 1–15, hereby incorporated by reference as illustrative of the prior art.

Most WWW Browser programs provide a backtracking facility. This facility allows the user to return to the previously selected hypertext node. These programs generally also provide a history facility that allows the user to select a page from a menu of previously visited pages. When returning to a previously visited page the user must reorient themselves to the page to remember where they were in that page often by spending significant amounts of time to reread the page to remember what they were doing with the page.

The Netscape® Navigator (one embodiment of a WWW Browser) provides a facility that positions a backtracked page to present the data seen during the last visit to the page. However, this application does not provide any hints as to what part of the page the user was looking at the last visit.

SUMMARY OF THE INVENTION

The present invention provides an economical, apparatus, method, system and computer program product for providing enhanced facilities to computer users. The invention helps a user of a display device to more quickly recover from a distraction that caused the user to look away from the display device. The user is also assisted when navigating hypertext documents by the invention indicating where the user last looked in a restored, previously viewed hypertext document One aspect of the invention is a computer controlled method for assisting a user of a computer to reestablish a lost context. The method makes use of a display device and a gaze-tracking device. The gaze-tracking device determines the user's gaze position on the display device. The first step of the method is that of monitoring the user's gaze position on the display device and of tracking a current context displayed in the active area of the display device. It also detects a break of attention from the active area of the display and saves the time and the current context as the lost context. The method restores the lost context and indicates the lost context to the user by applying an indicator to the lost context.

In another aspect of the invention, an information presentation apparatus is disclosed that is configured to assist a user to reestablish a lost context. This apparatus includes a central processor unit, a memory, a display device and a gaze-tracking device that determines a gaze position on the display device. This apparatus also includes a monitor mechanism that monitors the gaze position on the display and thus is configured to track a current context within an active area of the display. Additionally, the apparatus includes a first detection mechanism that cooperates with the monitor mechanism and is configured to detect a break of attention from said active area of the display device. A second detection mechanism, also cooperating with the monitor mechanism detects when the gaze position enters a target area (having a lost context) on the display. Once the second detection mechanism detects that the gaze position has entered a target area, a restoration mechanism restores the lost context in the target area. Finally, an indication mechanism indicates the lost context to the user by applying an indicator to the lost context.

Another aspect of the invention is an information presentation system that presents information on a display device to a user. This system includes a gaze-tracking device. The gaze-tracking device determines a gaze position on the display device. This system also includes a monitor mechanism that monitors the gaze position on the display and thus is configured to track a current context within an active area of the display. Additionally, the system includes a first detection mechanism that cooperates with the monitor mechanism and is configured to detect a break of attention from said active area of the display device. A second detection mechanism, also cooperating with the monitor mechanism detects when the gaze position enters a target area (having a lost context) on the display. Once the second detection mechanism detects that the gaze position has entered a target area, a restoration mechanism restores the lost context in the target area. Finally, an indication mechanism indicates the lost context to the user by applying an indicator to the lost context.

A final aspect of the invention discloses a computer program product having computer readable code embodied in a computer usable storage medium. When executed on a computer, the computer readable code causes a computer to effect a monitor mechanism, a first detection mechanism, a second detection mechanism a restoration mechanism and an indication mechanism having the same functions as the system described above.

The foregoing and many other objects and advantages of the present invention will no doubt become obvious to those of ordinary skill in the art after having read the following detailed description of the preferred embodiments which are illustrated in the various drawing figures.

DESCRIPTION OF THE PREFERRED EMBODIMENTS

Notations and Nomenclature

Figure 1:
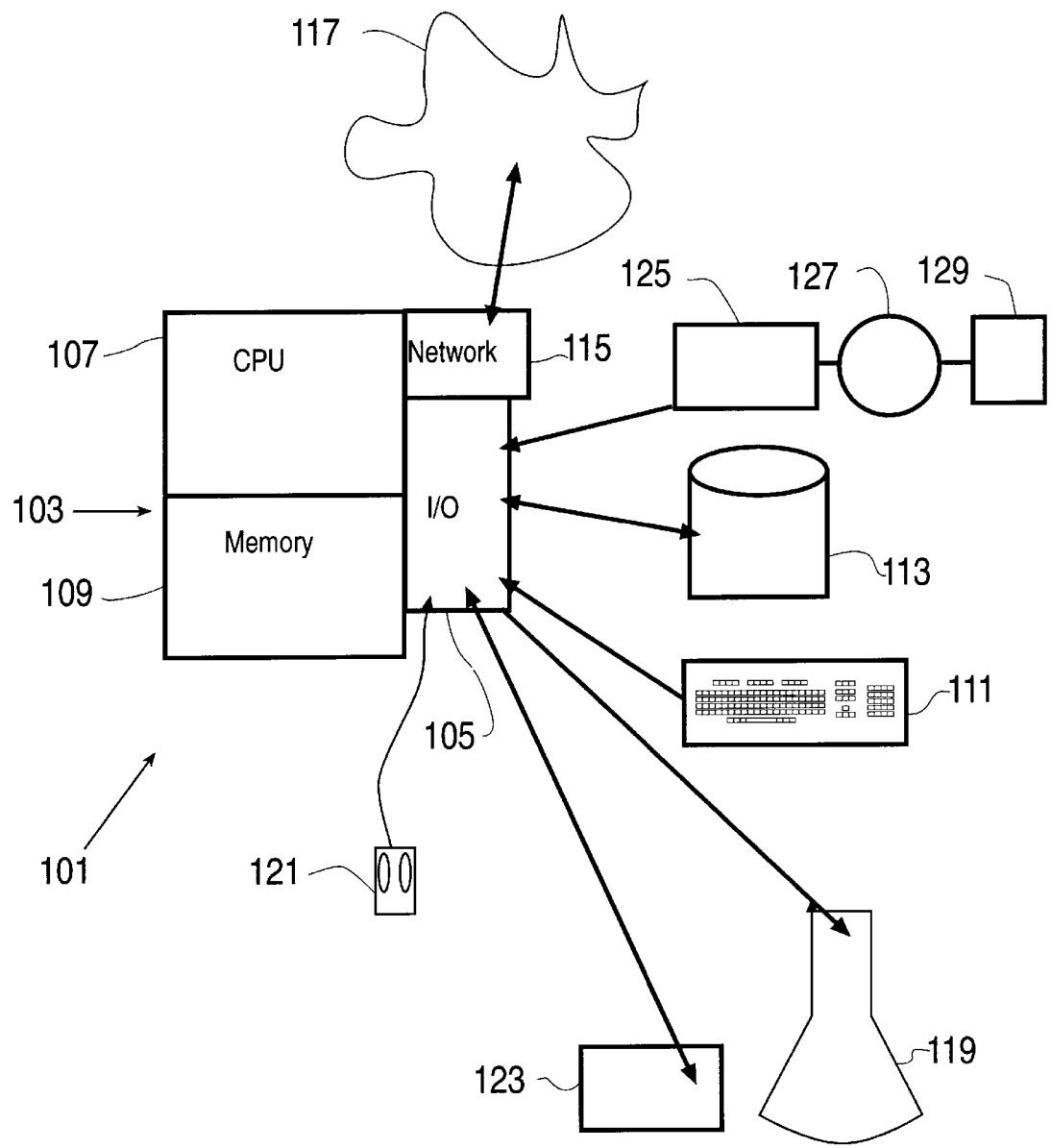
FIG. 1 illustrates a portion of a computer system, including a CPU and a conventional memory in which the present invention may be embodied.

The following "notations and nomenclature" are provided to assist in the understanding of the present invention and the preferred embodiments thereof.

Context—The position in a document displayed on a display device of interest to the user. A lost context is where a user was looking on a particular document before looking somewhere else. A current context is the position in a document that the user is currently looking at.

Graphical User Interface (GUI)—A user interface that allows a user to interact with a computer display by pointing at selectable control areas on the display and activating a command or computer operation associated with the selectable control area. GUIs are well known in the art.

Gaze position—An area of interest on the screen providing a boundary of the user's gaze over a limited period of time.

Gaze coordinates—The coordinates that represent the intersection of the user's gaze with the display screen over a limited period of time.

Gaze coordinates (raw)—The coordinates that represent the instantaneous intersection of the user's gaze with the display screen.

Image—Any information displayed on a display screen such as, but not limited to, pictures, drawings, illustrations, text, and video. An image generally displayed in a pane contained in a window. A still image is a picture. A moving image is comprised of a number of frames of still images that are played in sequence similar to a video Pointing device—A device responsive to a computer user's input that moves an cursor on a computer display screen. Such a cursor has an active point such that if the pointing device is activated (e.g., by a button push for a mouse device) a command associated with the selectable control area covered by the active point is invoked. Pointing devices are generally used with graphical user interfaces.

Selectable control area—An area on a computer display that is sensitive to activation of a pointing device. On activation of the pointing device over the selectable control area, a command or computer operation associated with the selectable control area is invoked. Most computer systems that provide a Graphical User Interface (GUI) also provide other methods for invoking these commands or computer operations such as keyboard function keys or command lines.

URL—A Uniform Resource Locator. URLs are used to access information on the World Wide Web.

Pane—An area in a window where information is provided.

Window—An area, usually rectangular, on a computer display screen controlled by an application.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

FIG. 1 illustrates a computer system referenced to by a general reference character 101, configured to support the invention. The system 101 includes a processor 103 having an Input/Output ("I/O") section 105, a central processing unit ("CPU") 107 and a memory section 109. The I/O section 105 is connected to a keyboard 111, a disk storage unit 113, a network interface 115 to provide access to a network 117, a display unit 119, a pointing device 121, a gaze-tracker device 123 and a CD-ROM drive unit 125 The CD-ROM unit 125 can read a CD-ROM medium 127 that typically contains a plurality of programs and data 129. The CD-ROM 125 drive unit, using the CD-ROM medium 127, and the disk storage unit 113 comprising a filestorage mechanism. One skilled in the art will understand that the filestorage mechanism may comprise read only memory, RAM or other storage technology that allows a computer to access data. Such a computer system is capable of executing programmed logic that embodies the invention.

Gaze Tracker Operation

Figure 2:
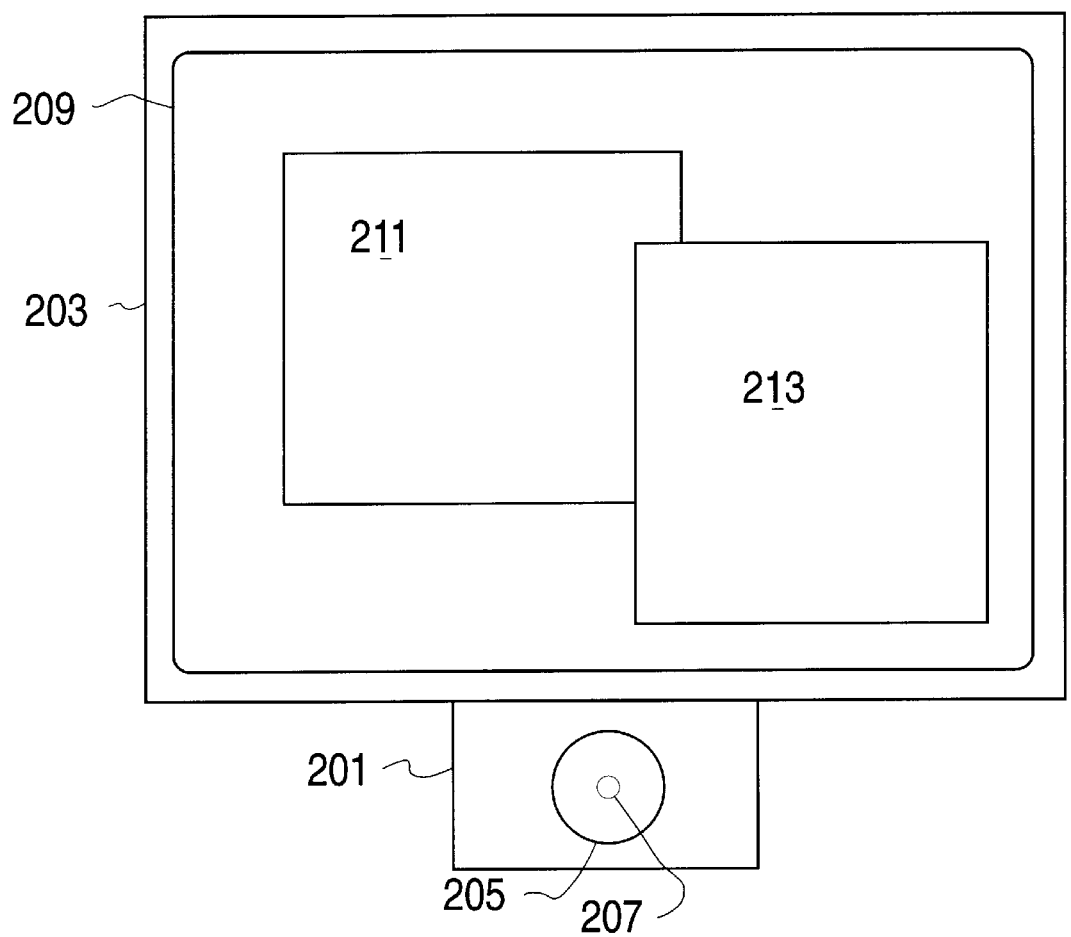
FIG. 2 illustrates a display device fitted with gaze tracking equipment.

FIG. 2 illustrates a gaze tracking device 201 attached to a computer display device 203. As illustrated, the gaze tracking device 201 is mounted below the computer display 203 and comprises a video lens 205, with an infrared LED 207 mounted on the center of the lens 205. One skilled in the art will understand that many different types of gaze tracking devices can be used with the invention. The computer display device 203 has a display area 209 that the computer can access to display information. The computer generally creates a plurality of windows 211 and 213 for this informational display. As the user looks at the display area 209, the gaze tracking device determines the users gaze position. The gaze coordinate (raw) is an ordered pair of values providing the immediate two dimensional coordinates of where the user's gaze is positioned on the screen. A number of gaze coordinates can be used to develop a gaze position that is a two dimensional coordinate of a time weighted average of the gaze coordinates. The invention need not have precise gaze coordinates. In fact the gaze coordinates need only be accurate to approximately a ¼ inch. One skilled in the art will understand that the gaze position could also be returned as a rectangle, polygon, circle or other shape representing an area of interest. Further one skilled in the art will understand that the gaze tracking device 201 may be configured to provide the gaze position only when the user has shown interest in a displayed area for a sufficient time, or that application or system program logic may be utilized to detect when the user has shown an interest by monitoring the gaze coordinates over some period of time. The gaze position is developed when the system detects that the user has become interested in a particular area of the display. The system detects this condition by recognizing that the user's gaze has been limited to a particular region of the displayable area 209 for a period of time.

Figure 3:
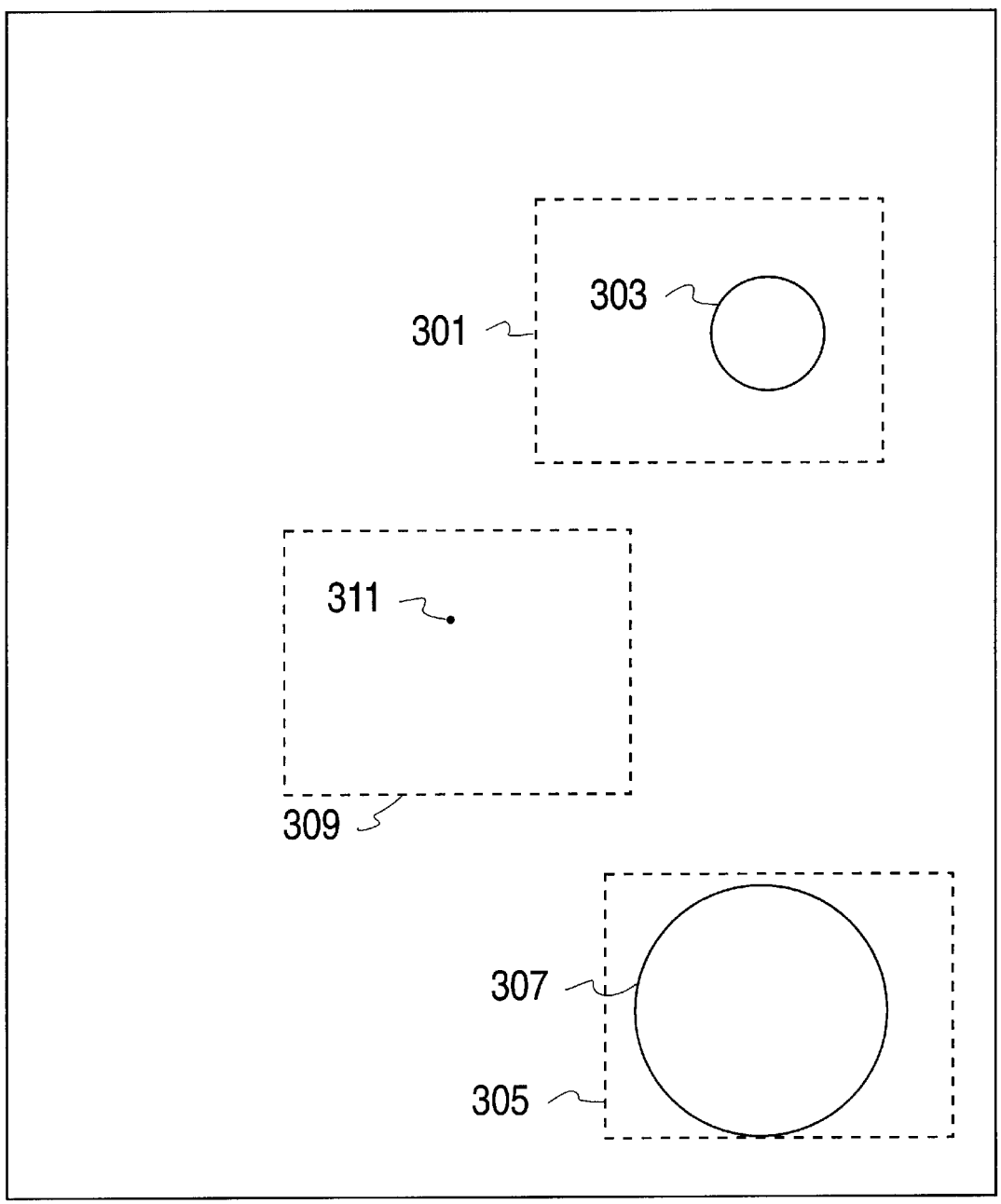
FIG. 3 illustrates aspects of a gaze position in accordance with a preferred embodiment.

FIG. 3 illustrates aspects of a gaze position determined from gaze coordinates returned from a gaze tracking device. A dashed rectangle 301 indicates the boundaries of an image (not shown). Because the gaze tracking device has an uncertainty and because the user's gaze constantly moves (because of involuntary eye movements) even when focused on an area of interest, this embodiment of the invention provides the gaze position as an area 303 where the user's gaze is fixed. The provided area 303 indicates that the user's gaze did not leave the specified area for a given time—such as a half second. The application program that uses the returned circular area 303 is able to determine that the user's gaze is well within the image 301 because the provided circle 303 is completely contained within the area of the image 301. If the user has interest in the entire image, the gaze would be more diffused resulting in a larger circle. For example, in comparing the image 301 with an image 305, the user viewing the image 301 has focused in on a particular aspect of the image 301 as indicated by the circle 303. The user viewing the image 305 has indicated more interest in the totality of the image 305 as compared to a particular aspect of the image 305 as indicated by a circle 307. One skilled in the art will understand that a rectangle or other area indication can be used as well as a circle.

In another embodiment of the invention, the gaze tracker returns the gaze position as a point. For example, a dashed rectangle 309 indicates the boundaries of a different image (again this image is not shown). In this embodiment, the gaze tracker, after processing gaze movements over some period of time, simply returns a point (a gaze coordinate) 311 that is a time weighted average of the position of the gaze.

Figure 4:
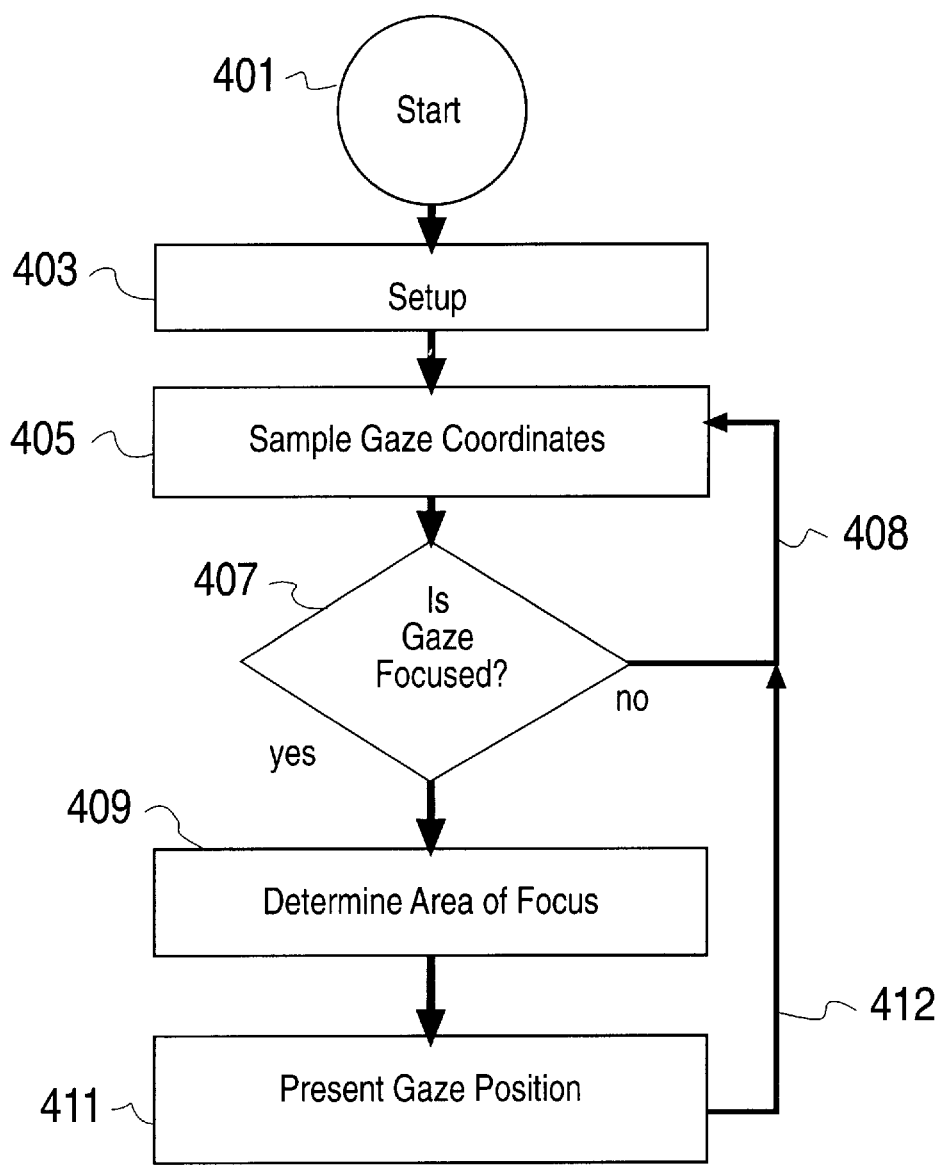
FIG. 4 illustrates the process for determining a gaze position as used in accordance with a preferred embodiment.

FIG. 4 illustrates the process used to develop a gaze position from a plurality of gaze coordinates (raw). The process starts at a terminal 401. Next at a step 403, the process performs any necessary setup or initialization steps. This includes initializing timer program logic to periodically gather instantaneous gaze coordinate data from the gaze tracker apparatus, acquiring user preference data and other one-time initializations. Next at a step 405, the process receives a plurality of gaze coordinates (raw). These gaze coordinates (raw) indicate the position of the user's gaze over a given time. After a sufficient number of gaze coordinates (raw) are gathered, the process examines the gaze coordinates (raw) for a focus pattern at a decision block 407. A focus pattern occurs when the gaze coordinates (raw) are all within some boundary without gaze coordinates (raw) being statistically far from the others. If, at the decision block 407, the gaze coordinates (raw) do not show a focused gaze, the gathering of instantaneous gaze coordinates (raw) continues as shown by an arrow 408. If at the decision block 407 a focus pattern is found then a step 409 determines an area of focus that contains the statistically significant gaze coordinates (raw). Finally, in a step 411 the gaze position is made available to the program logic for use. Finally, the process repeats as shown by an arrow 412. In the case where the gaze position is presented as an area instead of a simple coordinate pair, the receiving program logic determines which pane is overlapped by the gaze position.

There are various well known methods in the art to present the gaze position to program logic such as an application program. These include providing an exception to an application, sending an interprogram message containing the gaze position to the application and many other methods.

Using a gaze-tracking device, an executing computer program can modify its operation to assist the computer user in being more productive. It does this by reducing the time it takes for the user to locate where the user was looking on the computer display when the user was distracted. It also assists in the navigation of hypertext pages as the computer reminds the user where the user was in the page when the user left the page. A preferred embodiment of this invention using the gaze tracker is further described below.

As a user reads displayed text, the context includes what word is currently being read. The context also includes what sentence and what paragraph the user is reading. Further, if the user is looking at a picture on the computer display, the context includes both an identification of the picture and what area of the picture is being observed. If a computer user is interrupted or otherwise distracted from looking at the computer display, the user forgets where the user was looking—the user loses the context. As a result, when the user returns to the computer display, the user must remember where the user was reading (or what the user was looking at) when the interruption or distraction occurred. If the time required to process the interruption is short, often the users just needs to be directed to the word or sentence last looked at. If the time required to process the interrupt is significant, the user often need to reread more text to reacquire the lost context.

Figure 5B:
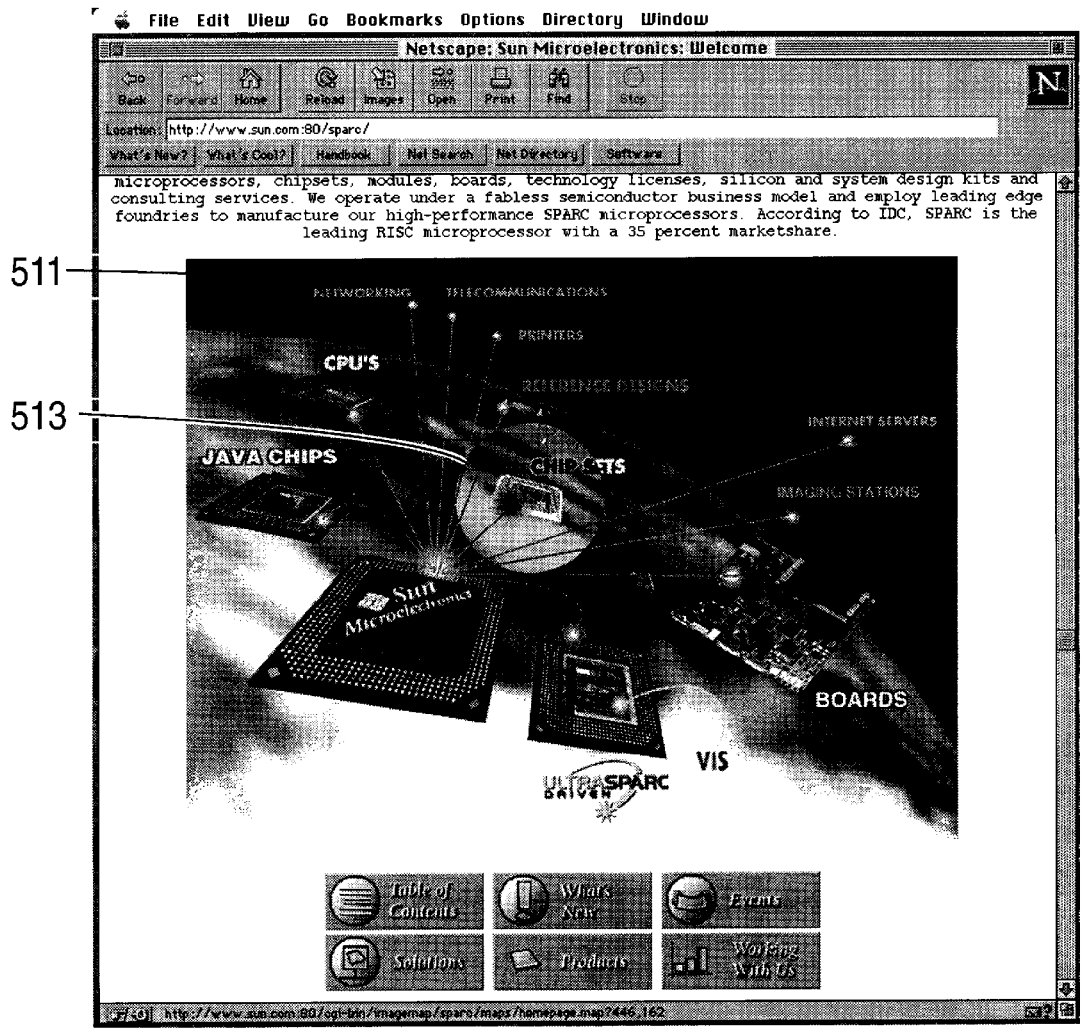
FIGS. 5a, b, c illustrate example indicators used to highlight lost context in accordance with a preferred embodiment.

One of the goals of the invention is to provide a method, apparatus, system, and computer program product for assisting a computer user in regaining a lost context after an interruption or distraction. FIGS. 5*a*, 5*b*, and 5*c* provide samples of how a computer user's gaze is attracted to different forms of a lost context.

FIG. 5*a* illustrates the results of number of ways to indicate lost context. The lost context is marked in a number of ways to assist the user in reacquiring the context. If the lost context was a single word (such as the word "TITLE") then, when the lost context is restored, the single word is indicated by a blinking reverse video of the word 501. If the lost context was a word in a body of text and if the delay between the time the context was lost and the time the lost context is restored is short then, a sentence containing the word is indicated by a blinking reverse video of the sentence 503. However, if the delay is extended then an entire paragraph containing the word is indicated by a blinking reverse video of the paragraph 505. One skilled in the art will understand that these indications can be in many forms. For example, but without limitation, highlighting the lost context by using color, by using a different typeface for the lost context, by boxing the lost context or any of a number of other methods used in the art. Further, one preferred embodiment of the invention "highlights" by using adding temporary indicators to the display. These indicators could be blinking arrows pointing to the lost context, a red circle placed around the lost context or other method used to distinguish the lost context from the rest of the document. One skilled in the art will also understand that only one of the indications illustrated in FIG. 5a will be used to indicate any given lost context.

FIG. 5b illustrates a graphical image 511 that is presented to the user. The context of the graphical image 511 is the coordinates of the gaze position on the graphical image 511. To indicate a lost context of the graphical image 511, an area around the coordinates of the lost context 513 is graphically altered to attract the user's eye. The area of the lost context 513 is displayed in reverse video, different color, or by other methods well understood in the art.

FIG. 5c illustrates a plurality of hyperlinks 521, 523, 525, and 527 presented on a hypertext page 529. Each of the anchors 521, 523, 525, and 527 representing hyperlinks are underlined. Often anchors are also indicated by text displayed in a different color. When a user activates a hyperlink by activating a pointing device over an anchor, the hypertext browser replaces the existing page with a new page. Thus, the lost context of the original hypertext page 529 is the hyperlink activated by the user. In FIG. 5c, the "WabiServer" hyperlink 521 was last activated. This hyperlink 521 is the lost context for the hypertext page 529.

Figure 6:
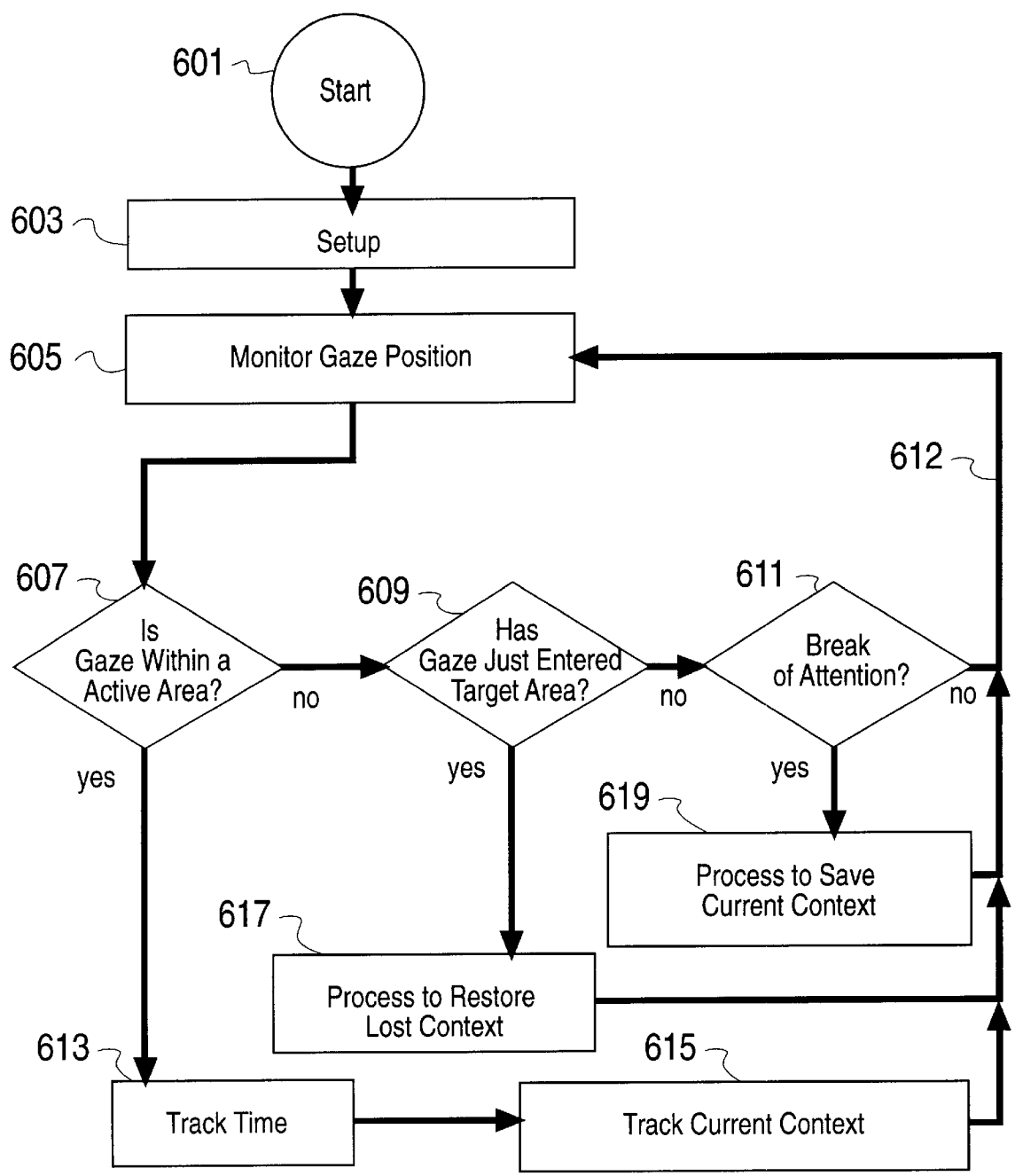
FIG. 6 illustrates the process used to monitor the gaze position in accordance with a preferred embodiment.

FIG. 6 illustrates the process used to monitor context. The process starts at a terminal 601. At a setup step 603 the process performs any initialization required for the process. At a monitor step 605, the process monitors the gaze position returned from the gaze-tracking device as described above. At a decision block 607, the process determines whether the gaze position is within an active area on the display device. An active area includes an active GUI window or pane.

If at the decision block 607 the gaze position was not within an active area, the process then determines, at a decision block 609, whether the gaze position has just entered a target area. A target area is a window or a pane that has once been monitored for context, but has become inactive because the user has looked away or because the user has activated a hyperlink. If the decision block 609 determines that the gaze position has not just entered a target area the process continues to a decision block 611 that determines whether a break of attention condition occurred. A break of attention condition occurs when the gaze position moves outside of the active area. Typically, this occurs when the user looks away from the computer display screen, or looks at another window on the display screen. Finally, as indicated by an arrow 612 the process returns to the monitor step 605 and the process repeats.

If the decision block 607 condition is satisfied, the process continues to a track time step 613 that obtains the current date and time from the computer. Next at a step 615 the process determines the current context by locating what the user is looking at by finding the intersection between the gaze position and what is displayed to the user on the display device—thus tracking the current context. Finally, the process repeats as indicated by the arrow 612. Recollect that due to the manner in which the gaze position is determined (as described above) the gaze position represents a moderately stable gaze and not a gaze coordinate (raw) that is in rapid transition between different areas of the display device.

If the decision block 609 condition is satisfied (hence the gaze position has just entered a target area), the process continues to a restore lost context step 617. The restore lost context step 617 is further described below describing FIGS. 8a and 8b. Once the restore lost context step 617 is completed, the process repeats as indicated by the arrow 612.

If the decision block 611 condition is satisfied (that a break of attention occurred), the process saves the current context at a step 619. This step 619 is further described below for FIG. 7a. Once the save current context step 619 is completed, the process repeats as indicated by the arrow 612.

Figure 7A:
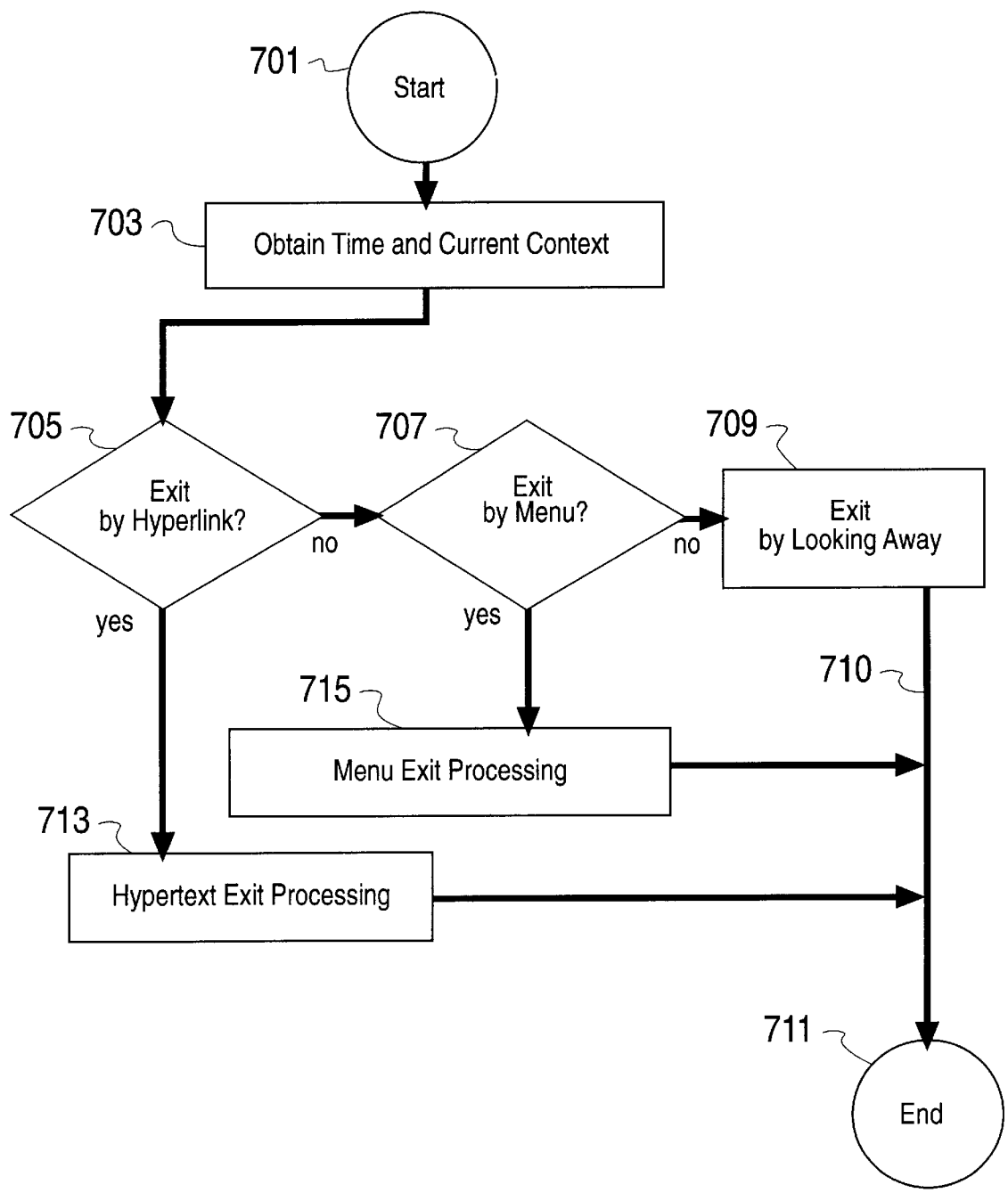
FIGS. 7a–d illustrate the process used to handle a beak of attention condition in accordance with a preferred embodiment.

FIG. 7a illustrates the process used by the save current context step 619. This process starts at a terminal 701. At a step 703, the process obtains the current time and current context as determined from the steps 613 and 615. Next, at a decision block 705, the process determine whether the break of attention was caused by invocation of a hyperlink. The invocation of the hyperlink causes a hypertext link transition away from the current hypertext page visited by the user. If this condition is not satisfied, the process checks at a decision block 707 whether the break of attention was caused by an exit through a menu command such as by use of a bookmark or history menu such as provided by a WWW browser application. If this condition is not satisfied, the process continues to a step 709 that handles the user looking away from the active area and is further described for FIG. 7b. Finally, the process completes through a terminal 711.

Figure 7B:
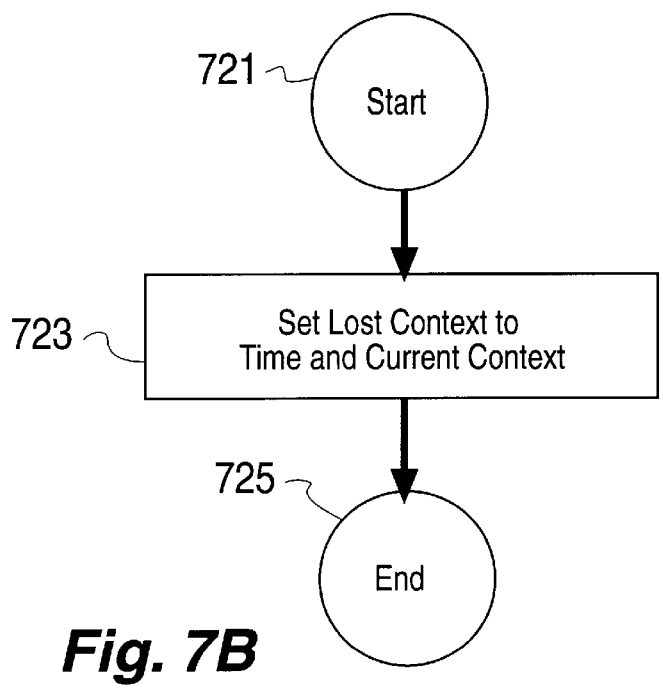
Figure 7C:
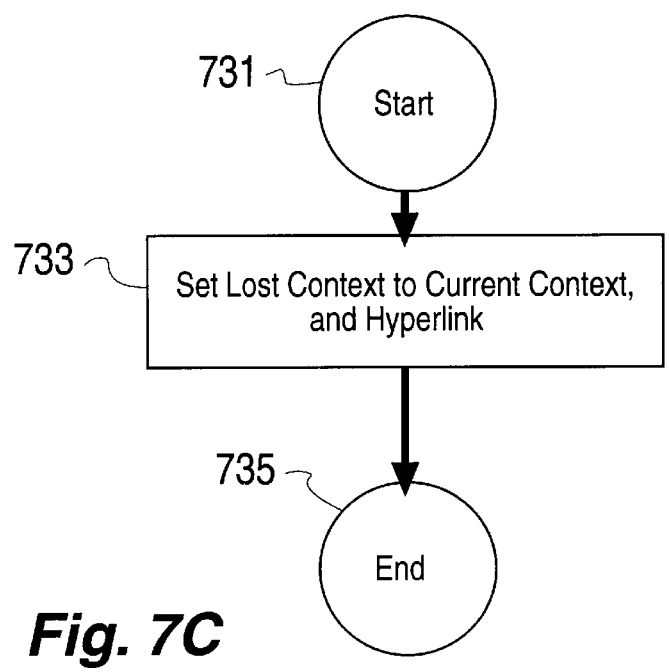

If the decision block step 705 condition is satisfied (invocation of a hyperlink), the process handles hyperlink exit processing at a step 713 and is further described for FIG. 7c. The process again completes through the terminal 711.

Figure 7D:
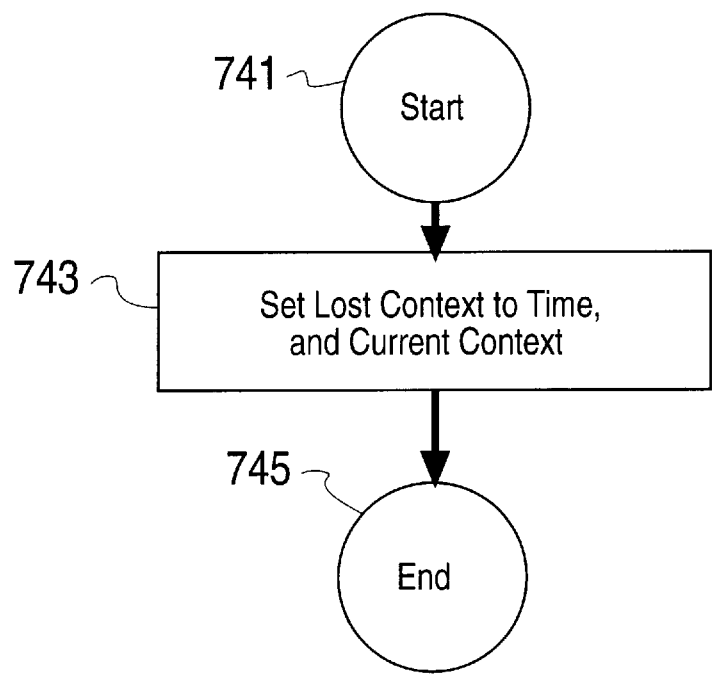

If the decision block step 707 condition is satisfied (invocation of a hyperlink through a menu), the process handles menu exit processing at a step 715 and is further described for FIG. 7d.

FIG. 7b illustrates the process used when the user looks away from the active area. The process is invoked at the step 709 and starts at a terminal 721. At a step 723, the process sets the lost context to that of the current context and time obtained from the step 703. This lost context is saved in association with the previously active area so that the lost context can be recovered when the previously active area is once again made active. Finally, the process completes through a terminal 725. Specifically, in the case of a hypertext document, the lost context is recorded within the browser's history list along with the URL of the hypertext page. If the lost context is a word in the HTML data, the process saves the word's character-offset within the HTML data in the history list. If the lost context is an image, both the image's character-offset and the gaze position within the image is recorded in the history list. For other types of documents, the lost context is stored in a database that correlates the lost context information with the document.

FIG. 7c illustrates the process used when the user exits the active area by directly activating a hyperlink (by positioning a pointing device over an anchor and activating the pointing device). Thus, the lost context is that of the anchor. The process is invoked at the step 705 and starts at a terminal 731. At a step 733, the process sets the lost context to that of the current context and time obtained from the step 703. The lost context is recorded within the browser's history list along with the URL of the hypertext page. Because the lost context is an anchor in the HTML file, the process saves the anchor's character-offset within the HTML data in the history list. If the lost context is an image anchor, both the image's character-offset and the gaze position within the image is recorded in the history list.

FIG. 7d illustrates the process used when the user exits the active area by using a menu to activate a hyperlink (by selecting a hypertext page from a menu such as a history or bookmark menu). This process is invoked at the step 707 and starts a terming 741. At a step 743, the process sets the lost context to that of the current context and time obtained from the step 703. This lost context is saved in association with the previously active area so that the lost context can be recovered when the previously active area is once again made active. Finally, the process completes through a terminal 745. Specifically, in the case of a hypertext document, the lost context is recorded within the browser's history list along with the URL of the hypertext page. If the lost context is a word in the HTML data, the process saves the word's character-offset within the HTML data in the history list. If the lost context is an image, both the image's character-offset and the gaze position within the image is recorded in the history list. For other types of documents, the lost context is stored in a database that correlates the lost context information with the document.

Figure 8A:
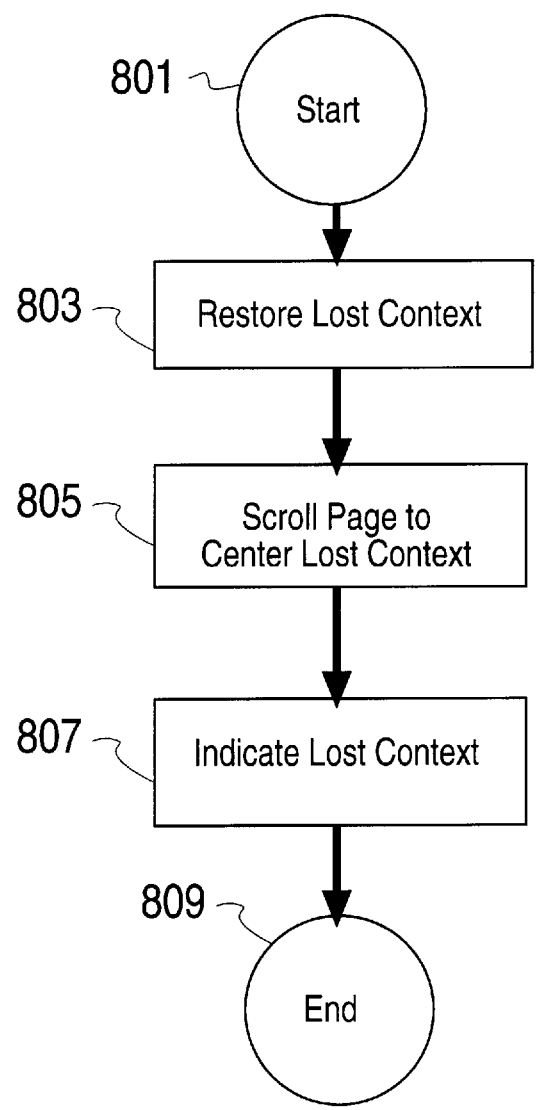
FIGS. 8a, b illustrate the processes used to restore and indicate lost context in accordance with a preferred embodiment.

FIG. 8a illustrates the process used to restore the lost context. This process is invoked from the step 617 after the gaze position enters a target area. A target area is a displayed area on the display device that has associated saved lost context information. The process starts at a terminal 801. Next, at a step 803, the lost context information retrieved. Once the process has the lost context information, the process, at a step 805, positions the information in the target area so that the context is displayed to the user. Then at a step 807 the process indicates the lost context to the user so that the user's gaze is attracted to the context. The step 807 is described below for FIG. 8b. Finally, the process completes through a step 809.

Figure 8B:
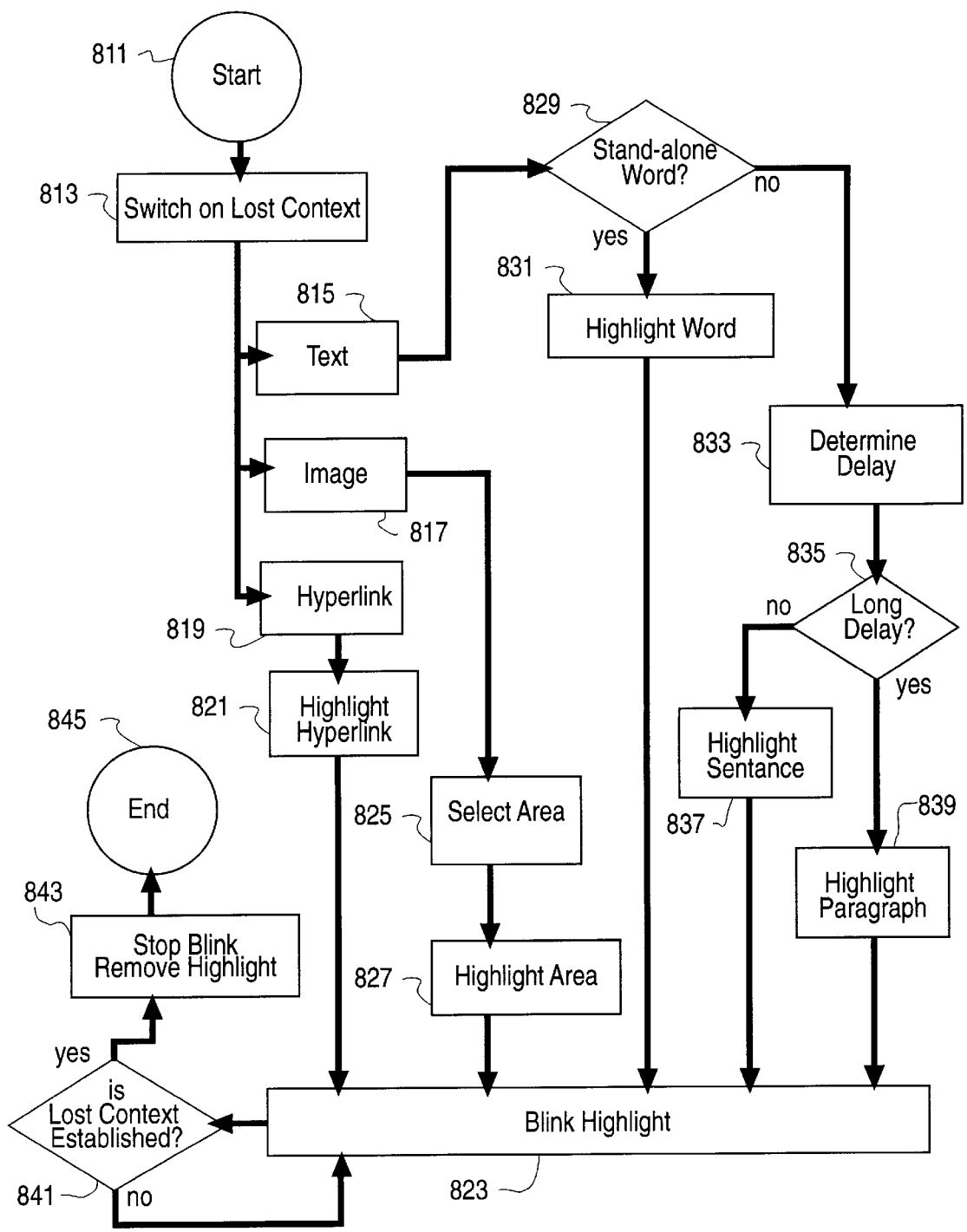

FIG. 8b illustrates the process used to indicate the lost context so as to assist the user in rapidly reacquiring the context. The process, invoked from the step 807 of FIG. 8a. The process starts at a terminal 801. Then at a switch step 803 the process checks the lost context to determine whether the lost context was a text related, image related, or hyperlink related context. If the lost context is text related, the switch step 803 invokes a text case step 805. If the lost context is text related, the switch step 803 invokes an image case step 807. If the lost context is text related, the switch step 803 invokes a hyperlink case step 809.

If the hyperlink case step 809 is invoked, the indication of the lost context is by highlighting, at a step 811, the hyperlink anchor. One preferred embodiment of the invention highlights the anchor as shown at the label 521 of FIG. 4c. Next, the process causes the highlighting to blink at a step 813. One skilled in the art will understand that the blinking highlight serves to attract the user's attention. There are additional ways to attract the user's attention well understood in the art contemplated by the invention.

If the image case step 807 is invoked, a step 815 locates the previous gaze position on the image and selects the area within a circle centered on the previous gaze position. Next, at a step 817 the process highlights the circled area as shown at the label 513 of FIG. 5b. Next, the process causes the highlighting to blink at the step 813.

If the text case step 805 is invoked, a decision block 819 determines whether the lost context indicated a stand-alone word. If this condition is satisfied, the process at a step 921 then highlights that word as shown at the label 501 of FIG. 5a. Next, the process causes the highlighting to blink at the step 813. If the lost context does not indicate a single word at the decision block 819, the process determines, at a step 823, the length of time the context was lost. If at a decision block 825 this delay time is shorter than a user set preference, a highlight sentence step 827 highlights the sentence containing the lost context. Next, the process causes the highlighting to blink at the step 813. However, if at the decision block 825, the delay was not shorter than the user set preference, a highlight paragraph step 829 highlights the entire paragraph containing the lost context. Next at the step 813, the process causes the highlighting to blink.

At this point, the lost context is displayed on the screen, is highlighted and is blinking. However, the user may still not immediately look at the lost context. At a decision block 831, if the gaze position has not yet intersected the lost context the process moves to the step 813 that continues blinking the lost context. However, if at the decision block 831, the lost context and the gaze position intersect, the lost context is reestablished and becomes the new current context. At a step 833, the process stops the blink maintained by the step 813 and removes the highlight. Finally, the process completes through a terminal 835.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for assisting a user of a computer to reestablish a lost context; said computer having a display device, and a gaze-tracking device; said gaze-tracking device for determining a gaze position on said display device; said computer controlled method comprising the steps of:

(a) monitoring said gaze position to track a current context within an active area of said display device;

(b) detecting a break of attention from said active area and saving said current context at the time of said break of attention as said lost context;

(c) restoring said lost context; and (d) indicating said lost context to said user by applying an indicator to said lost context.

2. The computer controlled method of claim 1 wherein said break of attention is detected when said gaze position moves out of said active area.

3. The computer controlled method of claim 2 wherein step (c) further comprises:

(c1) detecting entry of said gaze position into a target area having said lost context; and (c2) making said target area said active area.

4. The computer controlled method of claim 3 wherein step (d) further comprises:

(d1) detecting an intersection with said gaze position and said lost context;

(d2) removing said indicator; and (d3) resuming current context monitoring.

5. The computer controlled method of claim 1 wherein said break of attention is detected by activation of a hypertext link transition away from a visited page.

6. The computer controlled method of claim 5 wherein step (c) further comprises restoring said visited page containing said lost context.

7. The computer controlled method of claim 6 wherein step (d) further comprises:
- (d1) detecting an intersection with said gaze-position and said lost context;
- (d2) removing said indicator; and
- (d3) resuming current context monitoring.

8. An information presentation apparatus configured to assist a user of a computer to reestablish a lost context; said apparatus having a central processor unit, a memory, a display device, and a gaze-tracking device for determining a gaze position on said display device; said apparatus comprising:
- a monitor mechanism configured to monitor said gaze position to track a current context within an active area of said display device;
- a first detection mechanism cooperating with said monitor mechanism, configured to detect a break of attention from said active area; said first detection mechanism also configured to save said current context at the time of said break of attention as said lost context;
- a second detection mechanism also cooperating with said monitor mechanism configured to detect when said gaze position enters a target area on said display device; said target area having said lost context;
- a restoration mechanism configured to restore said lost context in said target area responsive to said second detection mechanism; and
- an indication mechanism configured to indicate said lost context to said user by applying an indicator to said lost context on said display device.

9. The information presentation apparatus of claim 8 wherein said break of attention is detected when said gaze position moves out of said active area.

10. The information presentation apparatus of claim 8 wherein said indication mechanism further comprises:
- an intersection detection mechanism configured to detect an intersection with said gaze position and said lost context;
- an indicator removal mechanism configured to remove said indicator after said intersection detection mechanism detects said intersection; and
- a resumption mechanism configured to resume said monitor mechanism.

11. The information presentation apparatus of claim 8 wherein said break of attention is detected by activation of a hypertext link transition away from a visited page.

12. The information presentation apparatus of claim 11 wherein said restoration mechanism is further configured to restore said visited page containing said lost context.

13. The information presentation apparatus of claim 12 wherein said indication mechanism is further comprises:
- an intersection detection mechanism configured to detect an intersection with said gaze position and said lost context;
- an indicator removal mechanism configured to remove said indicator after said intersection detection mechanism detects said intersection; and
- a resumption mechanism configured to resume said monitor mechanism.

14. An information presentation system configured to assist a user to reestablish a lost context; said system having a display device, and a gaze-tracking device for determining a gaze position on said display device; said system comprising:
- a monitor mechanism configured to monitor said gaze position to track a current context within an active area of said display device;
- a first detection mechanism cooperating with said monitor mechanism, configured to detect a break of attention from said active area; said first detection mechanism also configured to save said current context at the time of said break of attention as said lost context;
- a second detection mechanism also cooperating with said monitor mechanism configured to detect when said gaze position enters a target area on said display device; said target area having said lost context;
- a restoration mechanism configured to restore said lost context in said target area responsive to said second detection mechanism; and
- an indication mechanism configured to indicate said lost context to said user by applying an indicator to said lost context on said display device.

15. The information presentation system of claim 14 wherein said break of attention is detected when said gaze position moves out of said active area.

16. The information presentation system of claim 14 wherein said indication mechanism further comprises:
- an intersection detection mechanism configured to detect an intersection with said gaze position and said lost context;
- an indicator removal mechanism configured to remove said indicator after said intersection detection mechanism detects said intersection; and
- a resumption mechanism configured to resume said monitor mechanism.

17. The information presentation system of claim 14 wherein said break of attention is detected by activation of a hypertext link transition away from a visited page.

18. The information presentation system of claim 17 wherein said restoration mechanism is further configured to restore said visited page containing said lost context.

19. The information presentation system of claim 18 wherein said indication mechanism is further comprises:
- an intersection detection mechanism configured to detect an intersection with said gaze position and said lost context;
- an indicator removal mechanism configured to remove said indicator after said intersection detection mechanism detects said intersection; and
- a resumption mechanism configured to resume said monitor mechanism.

20. A computer program product comprising:
- (a) a computer usable storage medium having computer readable code embodied therein for causing a computer to assist a user to reestablish a lost context; said computer readable code comprising:
- (b) computer readable code configured to cause said computer to effect a monitor mechanism configured to monitor a gaze position to track a current context within an active area of a display device;
- computer readable code configured to cause said computer to effect a first detection mechanism cooperating with said monitor mechanism, configured to detect a break of attention from said active area; said first detection mechanism also configured to save said current context at the time of said break of attention as said lost context;
- computer readable code configured to cause said computer to effect a second detection mechanism also cooperating with said monitor mechanism configured to detect when said gaze position enters a target area on said display device; said target area having said lost context;

computer readable code configured to cause said computer to effect a restoration mechanism configured to restore said lost context in said target area responsive to said second detection mechanism; and computer readable code configured to cause said computer to effect an indication mechanism configured to indicate said lost context to said user by applying an indicator to said lost context on said display device.

21. The computer program product of claim 20 wherein said break of attention is detected when said gaze position moves out of said active area.

22. The computer program product of claim 20 wherein said indication mechanism further comprises:

computer readable code configured to cause said computer to effect an intersection detection mechanism configured to detect an intersection with said gaze position and said lost context;

computer readable code configured to cause said computer to effect an indicator removal mechanism configured to remove said indicator after said intersection detection mechanism detects said intersection; and computer readable code configured to cause said computer to effect a resumption mechanism configured to resume said monitor mechanism.

23. The computer program product of claim 20 wherein said break of attention is detected by activation of a hypertext link transition away from a visited page.

24. The computer program product of claim 23 wherein said restoration mechanism further comprises computer readable code configured to cause said computer to restore said visited page containing said lost context.

25. The computer program product of claim 24 wherein said indication mechanism is further comprises:

computer readable code configured to cause said computer to effect an intersection detection mechanism configured to detect an intersection with said gaze position and said lost context;

computer readable code configured to cause said computer to effect an indicator removal mechanism configured to remove said indicator after said intersection detection mechanism detects said intersection; and computer readable code configured to cause said computer to effect a resumption mechanism configured to resume said monitor mechanism.

\* \* \* \* \*